April 27, 1926.  1,582,269
A. Z. JOHNSON ET AL
ELECTRICAL WELDING MACHINE
Filed Jan. 23, 1924  4 Sheets-Sheet 1

Inventors
Axel Z. Johnson
Nels R. Johnson
By Clarence E. Walker
Their Attorney

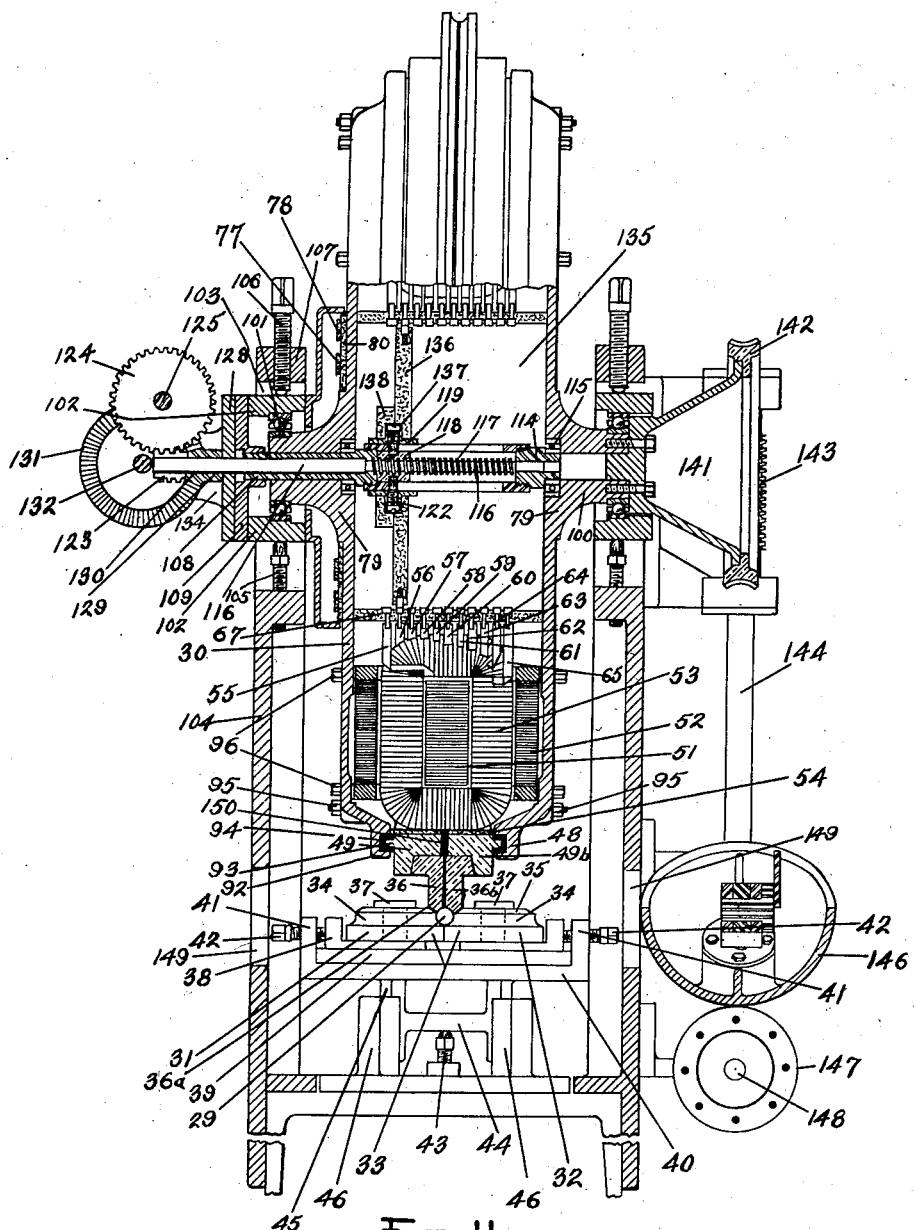

April 27, 1926. 1,582,269
A. Z. JOHNSON ET AL
ELECTRICAL WELDING MACHINE
Filed Jan. 23 1924  4 Sheets-Sheet 4
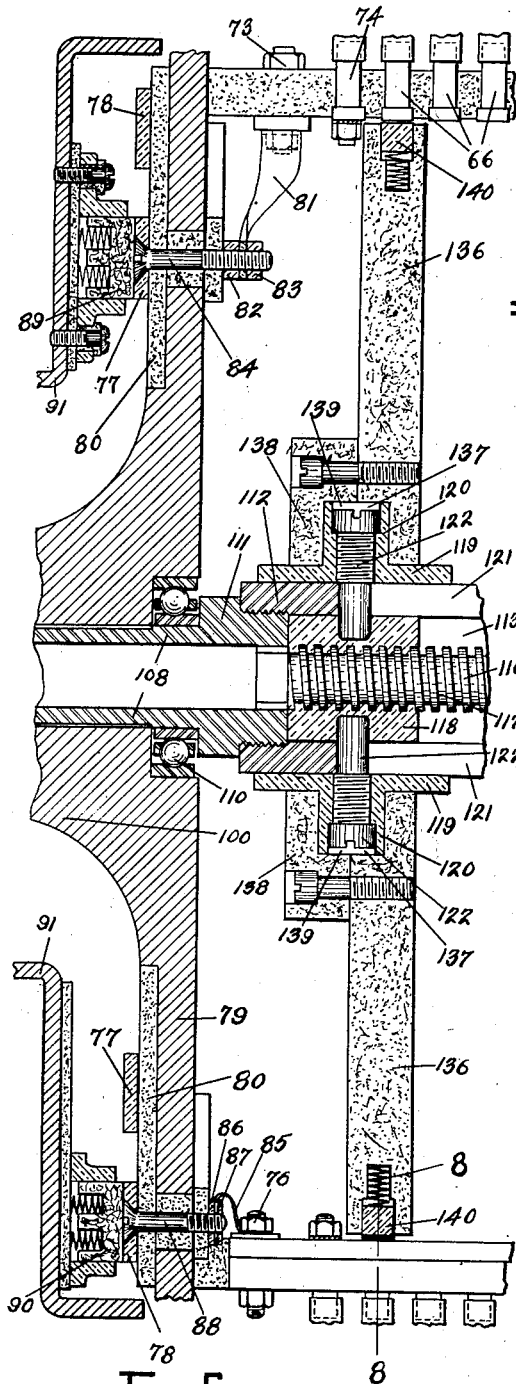
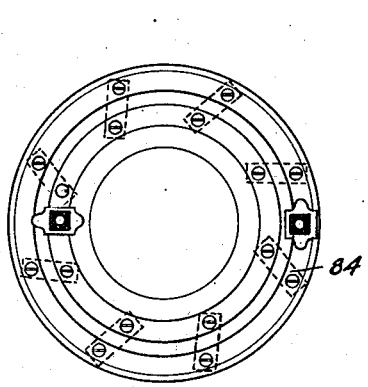
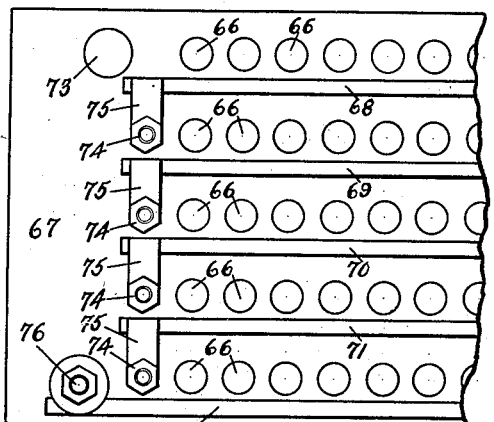
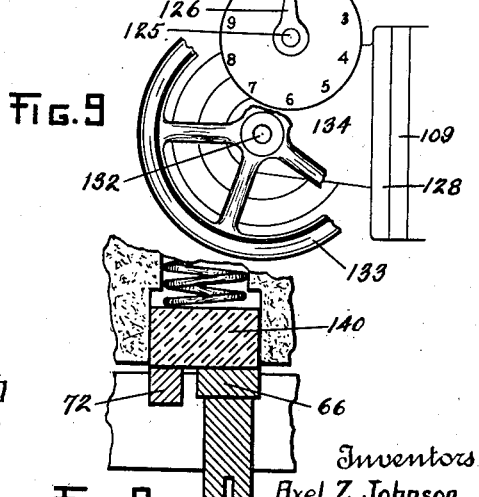
Inventors
Axel Z. Johnson
Nels A. Johnson
By Clarence S. Walker
Their Attorneys Patented Apr. 27, 1926.

1,582,269

UNITED STATES PATENT OFFICE.

AXEL Z. JOHNSON AND NELS A. JOHNSON, OF JAMESTOWN, NEW YORK.

ELECTRICAL WELDING MACHINE.

Application filed January 23, 1924. Serial No. 687,928.

*To all whom it may concern:*

Be it known that we, AXEL Z. JOHNSON and NELS A. JOHNSON, are citizens of the United States, residing at the city of Jamestown, in the county of Chautauqua and State of New York, have invented certain new and useful Improvements in Electrical Welding Machines, of which the following, taken in connection with the accompanying drawings, is a specification.

This invention relates to an improvement in a method of butt welding steel tubing electrically at high speed with a minimum consumption and loss of current and in a machine for carrying out such method.

The methods employed and the machines built hitherto, while they have succeeded in producing butt welded tubing, are all objectionable as slow and unreliable and attended with great waste of electric current due to its transmission at low tension over a considerable distance to the welding unit or electrode. This, of necessity, follows from the general use of a stationary transformer which must be located away from the revolving electrode.

The primary object of this invention is to avoid the above objection by providing a transformer the secondary of which is, in the electrical sense, integral with the welding electrodes themselves so that the low tension current passes directly from the transformer to the electrode; said transformer preferably consisting of a plurality of transformers, connected in parallel, the secondaries of which transformers support and in part enclose the electrodes.

A further object of this invention is to provide for such transformers secondary coils having their base members slotted into two sections insulated from each other whereby the currents differing in potentiality are separated, said sections being in direct surface contact with the negative and positive electrodes, respectively.

Other objects reside in the various details of construction of this mechanism as will appear from a consideration of the following description taken in connection with the accompanying drawings which form a part thereof and in which—

Fig. 4 is an end elevation of the welding unit, parts being shown in cross section;

Fig. 5 is an enlarged view in section of a portion of the welding unit illustrating particularly the relationship of the transfer plate to the switch panels and the manner in which the current is supplied to and removed from the welding unit;

Fig. 6 is an elevation of a section of one of the switch panels;

Fig. 7 is an elevation of the contact rings showing the manner by which the electricity is fed into a lead from the welding unit;

Fig. 8 is an enlarged cross section taken along the line 8—8 of Fig. 5; and

Fig. 9 is the detailed view of the switch control.

Figure 1:
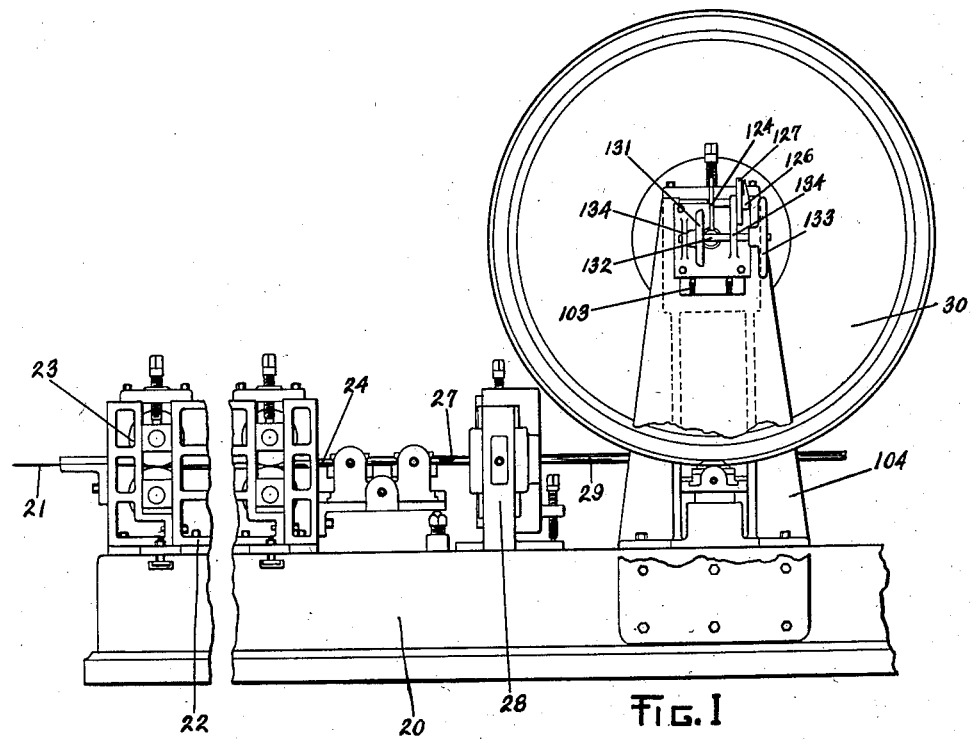
Fig. 1 is a side elevation of a welding machine embodying one form of this invention.
Figure 2:
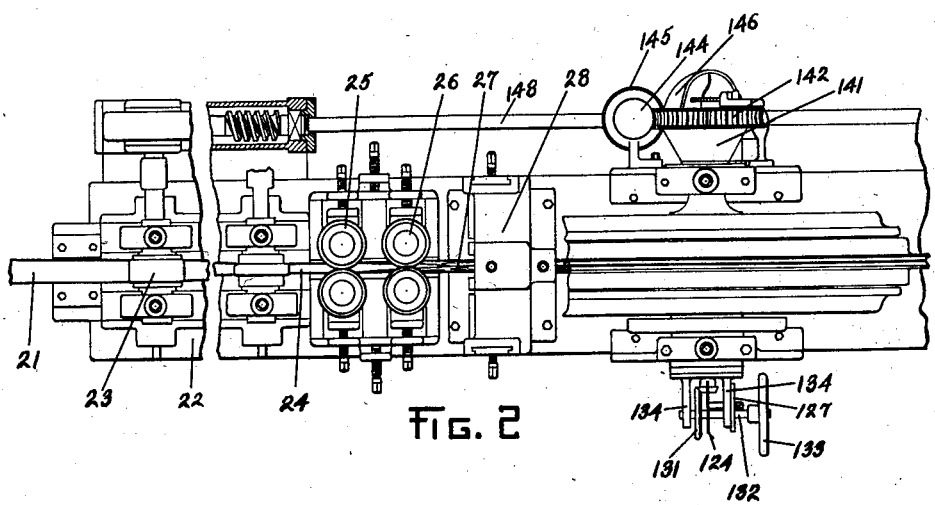
Fig. 2 is a plan view of such embodiment.

As pointed out above, the purpose of this invention is to convert a continuous strip of metal into a butt-welded tubing and includes the formation of the strip into butted edge tubing and the uniting of such edges by electric welding.

The step of forming the strip into tubing is old and well-known in the art and is only referred to incidentally in order to bring out the fact that the machine, designated as a unit by the numeral 20, is adapted to perform all the necessary functions in connection with the formation of butt-welded tubing. A continuous flat strip 21 is fed through the vertical sets of forming rolls 22, 23 which bend the longitudinal edges of the strips into the shape of a trough. Following the usual practice, a plurality of sets of forming rolls may be used but, in order to conserve space, we have merely shown the first and last sets. The partially formed tubing 24 is now fed from the vertical sets of rolls 22, 23 to the horizonal sets of rolls 25, 26. These rolls are all of suitable conformation to complete the conversion of the strip 21 into a U-shaped tube 27. The U-shaped tube 27 is then fed into the final forming device 28 from which it emerges as a completely formed tube 29 with the edges brought into abutting relation.

The welding operation is performed by a rotary welding unit 30 which contacts with both edges of the tube and by reason of its construction, which will be set forth in detail hereinbelow, causes the electric current to travel across the edges of the tube and weld them together.

The tube 29 is supported below the rotary welding unit 30 upon two horizontal rolls 31, 32 (see Fig. 4). These rolls are similar in construction and their bases 33 are in direct rolling contact with each other. Above the bases 33 are concaved portions 34 the formation of which are such that they engage more than half of the tube 29 and thus hold it firmly below the unit 30 with the butted edges in contact. Above the portions 34 are formed beveled portions 35 which bear against but are suitably insulated from the edges of the electrode 36. The relative position of the rolls is thus determined by the contact of the bases 33 and the contact of the portions 35 with the electrode 36.

The rolls 31, 32 are mounted to turn freely on parallel vertical pins 37, fixed in a platform 38, by the friction between the tube and the portions 34 and also that between the portions 35 and the electrode 36. The platform 38, which is made in two sections, rests upon a plate 39 carried on a flanged support 40. Through the flanges 41 of the support 40 extend bolts 42 which bear against the platform 38 so that by regulating the position of the bolts 42 the platform 38 can be adjusted laterally as desired to locate the tube 29 below the unit 30. The flanged support 40 may be raised and lowered by the operation of a bolt 43 bearing against the cross bar 44 of the projection 45 which extends from the underside of the flanged support 40. This movement of the support 40 is guided by ways 46 in which the projection travels.

Thus not only may these elements be adjusted with reference to the dimensions of the tubing operated upon but also any of them may be replaced should necessity arise. It has been determined that the best weld can be obtained by crowding the butted edges of the tubing together when the welding current is applied and consequently the circle defined by the concaved portions 33 of the rolls 31, 32, and the electrode 36 is slightly less in circumference than the circumference of the tube 29.

Experience has shown that for the best results in electrically butt welding it is essential that the voltage of the current be low and the amperage be high. This is obtained in the present machine by the use of a transformer, the energizing of which induces a secondary current of a strength varying proportionally to the strength of the primary current.

For convenience and ease in carrying out this requirement the transformer, by which this secondary current is induced, is divided into eight units 47 suitably arranged around the rotary welding unit 30. While these units 47 are in a sense independent, it will be noted that they must function simultaneously in order to provide the proper amount of welding current. The transformer units are rigidly mounted in the welding unit 30 so that they rotate therewith and so that the secondaries are at all times in direct contact with the electrode 36.

Each unit 47 comprises a two part section 48 of the two parallel secondary rings 49$^a$ and 49$^b$, formed to receive and partly enclose the electrode 36 which, like the rings 49, is also formed of two annular elements 36$^a$ and 36$^b$. The electrode 36$^a$ and ring 49$^a$ and the electrode 36$^b$ and ring 49$^b$ are in close contact and hence each set may be considered from the electrical standpoint as integral.

Due to the low tension of the welding current the air space between the electrode 36$^a$ and ring 49$^a$ and the electrode 36$^b$ and ring 49$^b$ will form sufficient insulation to prevent any short circuiting by reason of the difference in potential between the sets. However, since these elements are clamped in place as will be pointed out hereinbelow it has been deemed advisable to use bakelite or other suitable insulating material 150 to separate positively the sets and force the current to travel from one set to the other through the butted edges of the tube 29.

Projecting from and integral with each ring section 48 are a plurality of grids 50, six being provided in the present embodiment. These grids are preferably of the form shown and encircle an iron core 51 while being surrounded by an iron shell 52. The core 51 and shell 52 are here built up of a plurality of plates. Between each pair of grids 50 is inserted a coil 53 which is very similar in formation to the grids 50 in that it also encircles the iron core 51 and is, in turn, surrounded by the iron shell 52. The coils 53 are separated from the grids 50 and the ring section 48 by means of suitable insulation 54. The coils 53 shown are of the pancake type and are formed in the usual manner by winding wire over the soft metal core 51. The strip or lead 55 is connected to one end of the wire and the strip or lead 56 is connected to the other end of the wire so that current passed from strip 55 to strip 56 will completely energize the core 53. In order to control the amount of energy it is customary to regulate the amount of current fed to the coils by providing, in addition to the strip 56, which may be considered as the outlet, other leads connected to the wire at various points. In the present instance there have been provided the leads 57, 58, 59, 60, 61, 62, 63, 64 and 65. The current taken from the lead 57 has followed three less turns around the core than the current taken from the lead 56. This proportion has been followed throughout so that the number of turns are reduced equally in each case and hence the current taken from the lead 65 has passed through twenty-seven less turns around the core than the current taken from the lead 56. Any other proportion can, of course, be employed if desired depending upon the use to which the current is to be put.

The outlet leads 56 to 65, inclusive, of each coil are connected to buttons 66 which, as shown in Fig. 6, are mounted in the switch panel 67. Referring to that figure, it will be noted that a row of buttons 66 is provided for each of the five coils 53 in each transformer unit and below each row of buttons 66 is provided a bus-bar designated as 68, 69, 70, 71 and 72, respectively. The intake lead 55 of an outer coil 53 is connected to a post 73 at the end of the upper row of buttons 66 in the panel 67 while the leads 55 of the outer coils 53 are connected to posts 74 at the ends of the other rows of buttons 66. The posts 74 are electrically connected by strips 75 to the bus bars 68, 69, 70, and 71, respectively. The bus-bar 72 is longer than the other bars and is electrically connected to a post 76 in the panel 67.

On one side of the rotary welding unit 30 are mounted concentric rings 77, 78 separated from the side plate 79 of the unit 30 by suitable insulation 80. The inner ring 77 serves to supply current to the coils 53 of the transformers and the outer ring 78 serves to carry off the current therefrom. The post 73 of the panel 67 of each unit 47 is connected to the ring 77 preferably by means indicated in Fig. 5 in which a strap 81 secured to the post 73 is clamped between nuts 82, 83 upon a bolt 84 which is suitably insulated from the casing of the machine and imbedded in the ring 77. As shown in Fig. 7, there are eight of these bolts 84 provided one for each transformer unit so that all the switch panels 67 are independently connected with the ring 77. The ring 78 is similarly connected to the posts 76 of each panel 67 by means of the straps 85, nuts 86, 87 and bolts 88. Current is supplied to and taken from the rings in the present embodiment by means of brushes 89, 90 mounted on a stationary plate 91. While the ring 77 is referred to as supplying the current it will be understood that this is merely an arbitrary statement chosen to make the description easier since in alternating current there is a constant change in direction and both rings 77 and 78 serve to supply current.

The side plates 79 of the unit 30 are preferably castings identical in construction and completely enclose the transformer grids 50, coils 53 and panels 67 thus protecting them from injury. At their periphery the plates 79 terminate in opposed lateral annular pockets 92 which receive the annular flanges 93 of the secondary rings 49ª, 49ᵇ. Suitable insulation 94 is provided to prevent the escape of any current to the plates. The plates are clamped together by bolts 95 located adjacent the outer periphery. The transformer units 47 are fixed to the plates by bolts 96 and the panels 67 are similarly secured by bolts 97. The sections 48 of the secondary ring 49 are joined by bolts 98 and the electrode 36 is united to the ring 49 by bolts 99. Thus all parts of the welding unit are rigidly mounted so that the rotation thereof does in no way interfere with their operations.

Projecting from the center of the side plates 79 are bosses 100 by which the unit 30 is journaled in bearings 101 in blocks 102. These blocks are mounted in ways 103 of standards 104 rigidly secured to the base of the machine and are supported upon screw bolts 105. When the blocks 102 are properly adjusted they are held in place by the bolts 106 which extend through the top plates 107 bolted upon the standards 104.

Through the center of one boss 100, in Fig. 4 that at the left side, extends a tube 108 rigidly secured to a plate 109 on the block 103, and supported upon said boss by bearings 110. As shown in Fig. 5, this tube is spaced from the boss 100 so that it in no way interferes with the rotation of the unit. The tube 108 is enlarged adjacent its inner end to provide a shoulder 111 and is externally threaded as at 112 to receive the internally threaded end of the slotted tube 113. A centrally bored block 114 is similarly fixed in the other end of the tube 113 and is supported in the right side plate 79 upon bearings 115.

Through the center of the tubes 108 and 113, and block 114 extends a rod 116 the portion of which 117 lying within the tube 113 is provided with threads. In threaded engagement with the portion 117 is a block 118 which lies in the tube 113. Surrounding the tube 113 is a sleeve 119 from the center of which projects a ring 120. The tube 113 has diametrically opposed slots 121 through which slots bolts 122 threaded in the ring 120 of the sleeve 119 extend into the block 118.

Thus any reciprocation of the block 118 in the tube 113 caused by the rotation of the shaft 116 will cause the sleeve 119 and the ring 120 to travel longitudinally of the tube. At the outer end of the shaft 116 is provided a gear 123 which meshes with a wheel 124. The wheel 124 is mounted upon a shaft 125 at one end of which is fixed a pointer 126 which travels over a plate 127, so that any rotation of the shaft 116 is indicated by the travel of the pointer 126 over the plate 127. Rigidly fixed to the shaft 116 between the gear 123 and the plate 128, secured to plate 109, is a sleeve 129 having a geared portion 130. The portion 130 meshes with a larger gear wheel 131 which is carried on a shaft 132 to which is also secured a hand wheel 133. Hence, by the rotation of the hand wheel 133, the shaft is caused to rotate in either direction and the sleeve 119 and ring 120 are caused to travel over the tube 113. The shafts 125 and 132 are suitably mounted in arms 134 which project from the plate 128.

The panels 67 form with the side plate 79 an octagonal chamber 135 through the center of which extends the tube 113. As previously pointed out, the panels 67 are provided with rows of buttons 66 and with bus-bars 68, 69, 70, 71 and 72. Mounted upon the sleeve 119 is an octagonal-shaped plate 136, preferably of bakelite or other insulation material. As here shown, plate 136 is provided adjacent the ring 120 with an annular recess 137 which receives one-half of the ring 120. In addition to the plate 136 there is also provided a smaller plate, also of bakelite or similar material, 138 which is secured to the first plate and which has an annular recess 139, the recesses 137 and 139 together forming an annular pocket in which the ring 120 lies.

Figure 3:
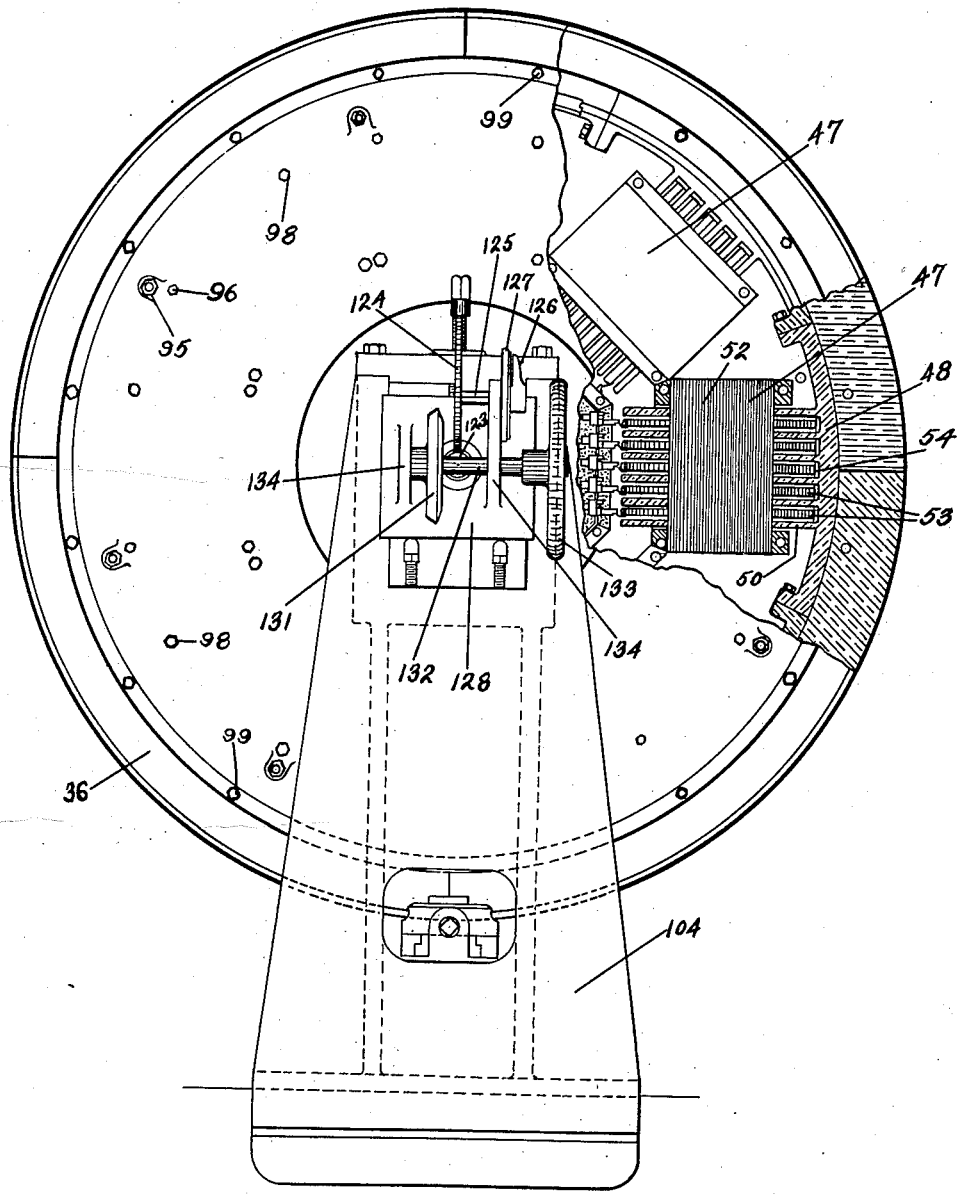
Fig. 3 is a side elevation of the welding unit with parts broken away.

The bakelite plate 136 is intended to act as a switch to control the supply of current to the various transformer coils. It is, therefore, provided along each of its eight edges with five spring pressed brushes 140. These brushes are so located that each of them is adapted to contact with one of the buttons 66 in one row and the bus-bar below the row. As will appear from an examination of Figs. 3 and 8, the brushes 140 along one edge connect one of the buttons 66 in the first row with the bus-bar 68; one of the buttons 66 in the second row with the bus-bar 69; one of the buttons 66 in the third row with the bus-bar 70; one of the buttons 66 in the fourth row with the bus-bar 71 and one of the buttons 66 in the fifth row with the bus-bar 72. Since all the brushes are in the same plane it is obvious that they have a uniform contact with each of the switch panels.

Referring to the drawings it will be noted that the current which is supplied to the coils from the ring 77 to the post 73 will travel through the first coil until it reaches the button 66 with which the brush 140 of the switch is in contact. It will then pass to the bus-bar 68 and from there through the strap 75 and post 74 into the second coil emerging therefrom through a similar lead to a button 66, thence through the brush 140 to the bar 69 and the third coil emerge through the button 66 through the brush 140 to the bus-bar 70 and the fourth coil and from the button 66 of that coil through the brush 140 to bus-bar 71 and the last coil from which it passes through button 66, brush 140 and bus-bar 72 to the post 76 and thence to the ring 78 from which it is carried off. By rotating the handle 133 the plate 136 is caused to travel across the octagonal chamber 135 and thus change the rate of transformation through the coils of all the transformers; hence, although a plurality of separate units are provided, it is obvious that these units operate simultaneously to energize the secondary rings 49$^a$, 49$^b$ and corresponding electrodes 36$^a$, 36$^b$. The rate of transformation can thus be quickly and accurately regulated in accord with the size and weight of the tubing used and the speed it is fed through the machine.

The rotation of the welding unit 30 is provided by means of a cone 141 which is rigidly secured to the boss 100 at the right of the unit as viewed in Fig. 4. To this cone 141 is fixed a gear 142 which meshes with the gear 143 on a suitably driven shaft 144. The shaft 144 is rotated through the frictional connection between a collar 145 and a cup 146 which is frictionally driven by a collar 147 on the main drive shaft 148, and which is capable of being adjusted in order to control the speed of the shaft 144. Openings 149 are provided in the standards 104 to permit easy access to the adjusting screws 42.

In electrically welding butted tubing by the use of alternating current, it has been observed that under most conditions the burr of the weld is provided with a "stitch-like" pattern, while under other conditions this pattern does not appear and the edges of the tubing are more firmly welded together. By the use of the welding machine embodying this invention it has been found possible to avoid the creation of this "stitch-like" pattern and consequently the welded tubing is much stronger. This result is obtained by a careful regulation of the travel of the tubing and the rate of transformation of the current through the coils. This last named regulation has never been obtained in prior machines and is due to the current control through the switch plate and panels above described. By the use of this control the operator is enabled to increase and decrease the rate of transformation instantly as soon as he notices the appearance on the tubing of the stitch-like pattern. The regulation of the speed of travel of the tubing can also be instantaneously obtained so that the operator can produce perfect tubing at all times by making the necessary changes.

While only one embodiment of this invention has been shown and described, we are not to be limited thereto since it is obvious that others may be made without departing from the spirit and scope of the invention as set forth in the following claims.

Having thus set forth our invention what we claim as new and for which we desire protection by Letters Patent is:

1. A tube welding machine comprising a rotary electrode, a transformer mounted upon and rotatable with said electrode, said transformer including means for regulating the ratio of transformation, and means for supporting the tube to be welded in contact with said electrode.

2. A tube welding machine comprising a rotary electrode, a transformer mounted upon and rotatable with said electrode, said transformer including means for regulating the ratio of transformation, the secondary element of said transformer being rigidly secured in contact with said electrode and means for supporting the tube to be welded in contact with said electrode.

3. A tube welding machine comprising a rotary electrode, a transformer mounted upon and rotatable with said electrode said transformer comprising a plurality of separate and independent units connected in parallel, the secondaries of said units being joined to form a support for said electrode and means for regulating the ratio of transformation and means for supporting the tube to be welded in contact with said electrode.

4. A tube welding machine comprising a rotary electrode, a transformer mounted upon and rotatable with said electrode said transformer comprising a plurality of separate and independent units connected in parallel, the secondaries of said units being joined to form a support for said electrode, the secondary of each unit having a circumferentially split base member, the sections of which are clamped against the opposite sides of said electrode and means for regulating the ratio of transformation and means for supporting the tube to be welded in contact with said electrode.

5. A tube welding machine comprising a rotary electrode, a transformer mounted upon and rotatable with said electrode said transformer comprising a plurality of separate and independent units, the secondary of each unit comprising a circumferentially slotted base member from which project a plurality of grids spaced apart, and a plurality of coils mounted in the spaces between the grids and means for supporting the tube to be welded in contact with said electrode.

6. A tube welding machine comprising a rotary electrode, a transformer mounted upon and rotatable with said electrode said transformer comprising a plurality of separate and independent units, the secondary of each unit comprising a circumferentially slotted base member from which project a plurality of grids spaced apart, a plurality of coils mounted in the spaces between the grids, and a switch panel for each unit, and a switch plate operating simultaneously upon all of said panels for regulating the ratio of transformation through said coils, and means for supporting the tube to be welded in contact with said electrode.

7. A tube welding machine comprising a rotary electrode, a transformer mounted upon and rotatable with said electrode said transformer comprising a plurality of separate and independent units, the secondary of each unit comprising a circumferentially slotted base member from which project a plurality of grids spaced apart, a plurality of coils mounted in the spaces between the grids, and a switch panel for each unit, said panel having a row of contact buttons connected to each coil and a bus-bar for each row of buttons and a switch plate having brushes connecting a button in each row with its bus-bar and means for connecting each button and each bus-bar with a supply of electric current whereby the switch plate regulates the ratio of transformation through said coils and means for supporting the tube to be welded in contact with said electrode.

8. A tube welding machine comprising a rotary electrode, a transformer mounted upon and rotatable with said electrode said transformer comprising a plurality of separate and independent units, the secondary of each unit comprising a circumferentially slotted base member from which project a plurality of grids spaced apart, a plurality of coils mounted in the spaces between the grids, an intake lead and a plurality of outlet leads from each coil, the latter leads being connected to said coil at various points to control the ratio of transformation through the coils, a switch panel having a row of contact buttons for each coil, one of said leads being connected to each button and a bus-bar for each row, straps connecting the buttons for all but one of the intake leads to all but one of said bus-bars, means for supplying current to said coil connected to the button of the remaining intake lead, and means for taking current from said coil connected to the remaining bus-bar, and means for supporting the tube to be welded in contact with said electrode.

9. A tube welding machine comprising a rotary electrode, a transformer mounted upon and rotatable with said electrode, said transformer comprising a plurality of separate and independent units connected in parallel, a switch panel for each unit, said panels being mounted edge to edge to define a chamber, a tube extending through said chamber, a switch plate mounted on said tube and means for moving said plate along said tube in contact with all of said panels.

10. A tube welding machine comprising a rotary electrode, a transformer mounted upon and rotatable with said electrode, said transformer comprising a plurality of separate and independent units connected in parallel, a switch panel for each unit, said panels being mounted edge to edge to define a chamber, a tube extending through said chamber, a switch plate mounted on said tube, means for moving said plate along said tube in contact with all of said panels and an indicator for designating the position of said plate in relation to said panels.

In testimony whereof we have affixed our signatures.

AXEL Z. JOHNSON.
NELS A. JOHNSON.